Dec. 25, 1945.  C. J. WAGNER  2,391,603
SURGE BRAKE FOR TRAILERS
Filed Feb. 7, 1944   2 Sheets-Sheet 1
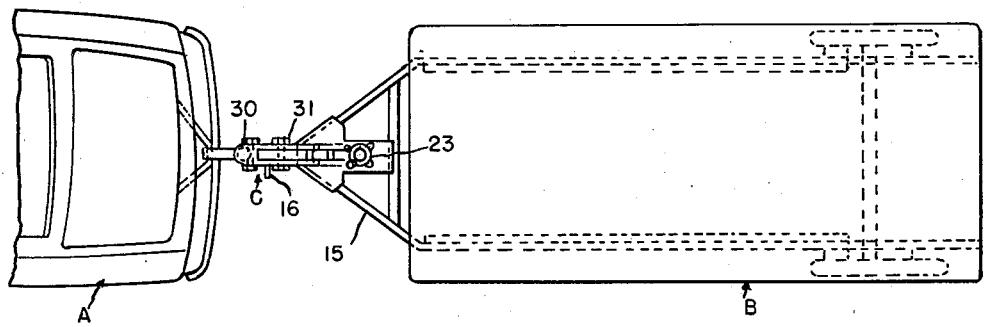
FIG.1.
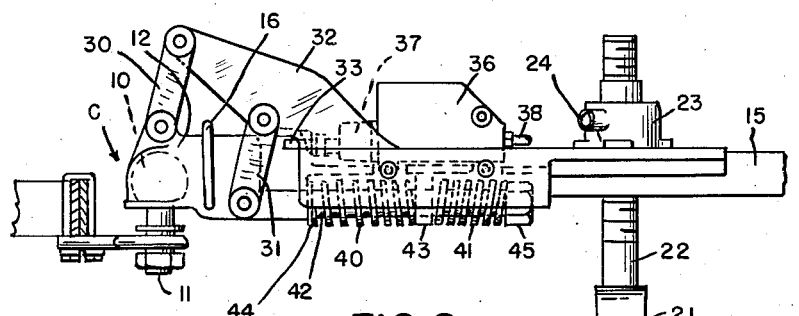
FIG.2.
FIG.4.
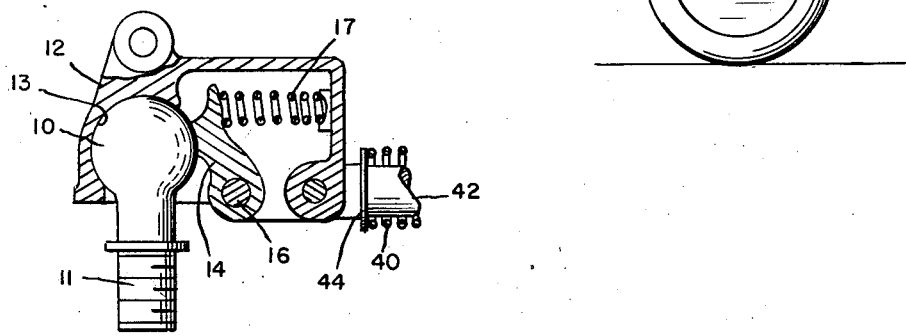
*INVENTOR.*
CARL J. WAGNER
BY
Whittemore Hulbert & Belknap
ATTORNEYS

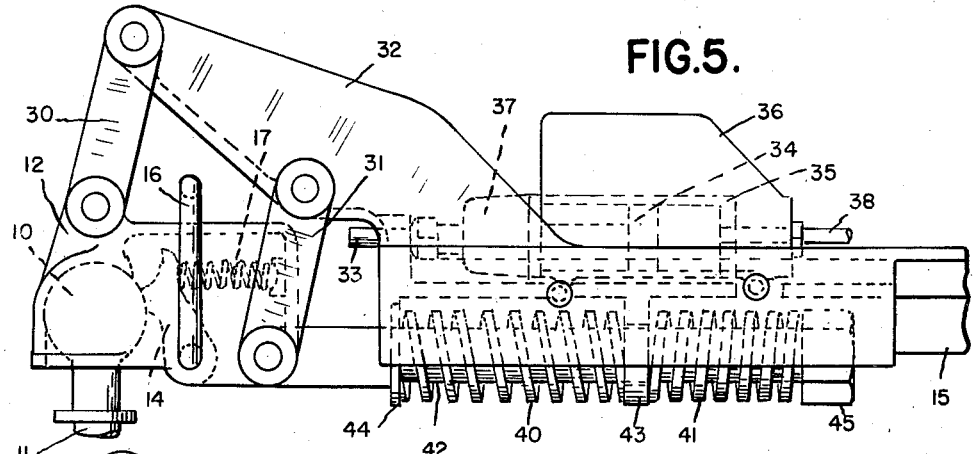
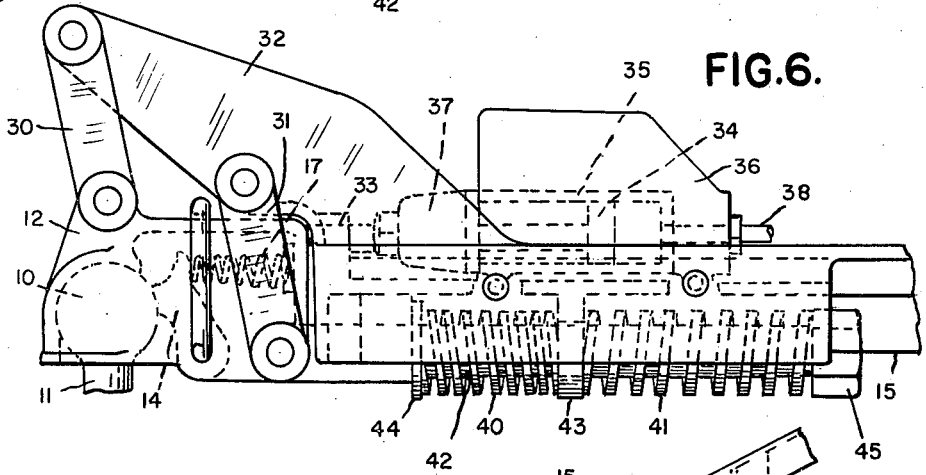
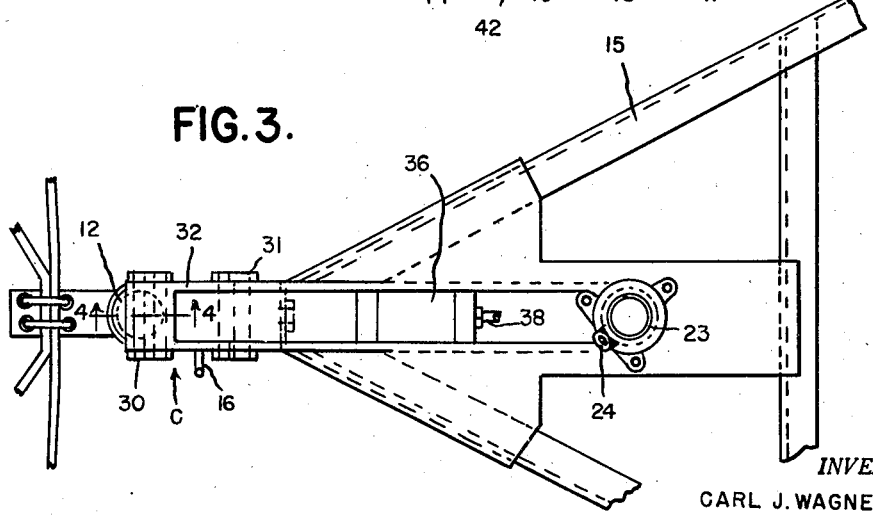

Patented Dec. 25, 1945

2,391,603

UNITED STATES PATENT OFFICE 2,391,603

SURGE BRAKE FOR TRAILERS

Carl J. Wagner, Detroit, Mich.

Application February 7, 1944, Serial No. 521,403

9 Claims. (Cl. 188—142)

This invention relates generally to vehicle couplings and refers more particularly to a coupling between a motor driven vehicle and a trailer.

One of the essential objects of the invention is to provide a coupling of the type mentioned that includes means operable independently of the brake mechanism of the motor vehicle for actuating suitable brake mechanism for the trailer.

Another object is to provide a coupling wherein the actuating means for the brake mechanism of the trailer is operable automatically by the surge action of the trailer when the brakes of the motor vehicle are applied.

Another object is to provied a coupling wherein the surge action of the trailer is utilized as aforesaid without being subjected to shearing loads or undue stresses which might bind, break or otherwise interfere with the proper operation of the parts.

Another object is to provide a coupling wherein a coupler head is operable in substantially a straight path to actuate an operating plunger of the brake mechanism of the trailer.

Another object is to provide a coupling wherein suitable spring means are provided substantially in alignment with the coupler head to normally maintain the same out of contact with the operating plunger and to absorb shocks incident to relative movement between the coupled vehicles.

Another object is to provide a coupling that is simple in construction, economical to manufacture, and efficient in operation.

Other objects, advantages and novel details of construction of this invention will be made more apparent as this description proceeds, especially when considered in connection with the accompanying drawings, wherein:

Figure 1 is a diagrammatic top plan view of a motor driven vehicle and a trailer having a coupling embodying my invention;

Figure 2 is a fragmentary elevational view of the vehicles illustrated in Figure 1 and showing the coupling embodying my invention;

Figure 3 is a top plan view of the structure illustrated in Figure 2;

Figure 4 is a vertical sectional view taken substantially on the line 4—4 of Figure 3;

Figure 5 is an enlarged fragmentary elevational view of the structural draft member, coupler head and associated parts, and showing the normal position of the coupler head in spaced relation to the operating plunger for the brake mechanism of the trailer;

Figure 6 is a view similar to Figure 5 but showing the position of the parts when the coupler head is in operative engagement with the operating plunger to actuate the brake mechanism.

Referring now to the drawings, A is the motor driven vehicle, B is the trailer, and C is a coupling embodying my invention.

As shown the coupling C comprises a coupler ball 10 having an attaching shank 11 fixed to the rear end of the motor driven vehicle A, a coupler head 12 having a socket 13 and spring pressed retainer arm 14, respectively, for receiving and holding the ball 10, and a structural draft member in the form of an attaching and supporting frame 15 for the coupler head 12 fixed to the forward end of the trailer B. Any suitable means, such as the hand lever 16 may be used to release the retainer arm 14 against the tension of the spring 17 when it is desired to uncouple the head 12 from the ball 10.

In the present instance the attaching frame 15 may be provided with a vertically adjustable ground engaging wheel 20 for supporting the forward end of the trailer B when the trailer is uncoupled from the motor vehicle A. Preferably this wheel 20 is carried by a fork 21 at the lower end of a vertical shaft 22 that threadedly engages a geared lifting device of conventional design within a housing 23 on the attaching frame 15. Any suitable means such as a crank (not shown) may be inserted in an opening 24 in one side of the housing 23 to operate the lifting device when it is desired to raise the wheel 20 after the trailer B has been coupled to the motor vehicle A or to lower the wheel 20 just before the trailer B is to be uncoupled from the motor vehicle.

In order that suitable brake mechanism for the trailer B may be actuated automatically by the surge action of the trailer when the motor vehicle A is stopped or slowed up, the coupler head 12 is suspended by links 30 and 31 from an elevated portion 32 of the attaching frame 15 so that such head 12 may move in substantially a horizontal path to actuate an operating plunger 33 for a piston 34 within a master cylinder 35 of a hydraulic brake mechanism for the trailer. However, in this connection, it is to be understood that the brake mechanism for the trailer may be any suitable type and is independent of the brake mechanism for the motor vehicle. Actually the brake mechanism per se for the trailer forms no part of the present invention.

Preferably the master cylinder 35 is within a housing 36 carried by the attaching frame 15 and is provided about the plunger 33 with a suitable seal 37 of rubber or other suitable material. Tubing 38 leads from the cylinder 35 to the brake cylinders (not shown) of the hydraulic brake mechanism for actuating the brakes in the usual manner.

Normally the coupler head 12 is spaced from the forward end of the plunger 33 to prevent accidental movement of the plunger during the normal movement or travel of the coupled vehicles. For maintaining the parts in this relation there are two springs 40 and 41, respectively, sleeved upon a slidable rod 42 which constitutes a rearward extension of the coupler head and extends loosely through a boss 43 of the frame 15. A collar 44 is carried by the rod 42 in advance of the spring 40, while a nut 45 is carried by the rod 42 in rear of the spring 41.

If desired, the rear spring 41 may be relatively heavy in weight while the forward spring 40 may be relatively light in weight. The light weight spring 40 permits rearward movement of the coupler head 12 into operative engagement with the plunger 33 when the brakes of the motor vehicle A are applied and returns the coupler head to normal position out of contact with the plunger when the motor vehicle again moves forward, while the heavy weight spring 41 resists any tendency of the rod 42 and coupler head 12 to move forward from or in advance of said normal position when the trailer B is being pulled by the motor vehicle A.

In use, when the brakes of the motor vehicle A are applied during forward travel of the coupled vehicles, the trailer B will surge forward toward the motor vehicle A and, in doing so, will cause the plunger 33 to be actuated by the coupler head 12 to operate the brake mechanism of the trailer. Inasmuch as the coupler head 12 is suspended by the links 30 and 31 it is apparent that it will remain in the path of and substantially in alignment with the plunger 33 during the surging action mentioned. Likewise, the rod 42 will slide in substantially a horizontal path in the boss 43 of the frame 15. Hence, the parts may be compactly arranged, and the action thereof is positive, direct and efficient.

What I claim as my invention is:

1. A device of the class described comprising a structural draft member attachable to a trailer, and two relatively movable elements carried by said draft member, one being a pivotally mounted coupler head, and the other being a slidable brake operating member normally spaced from and actuable by said coupler head.

2. A device of the class described comprising a structural draft member attachable to a trailer, a coupler head suspended from a portion of the draft member to move in substantially a straight path, and a brake operating member carried by the draft member in spaced relation to the coupler head and in the path of the latter for actuation thereby.

3. A device of the class described comprising a structural draft member attachable to a trailer, a coupler head carried by the draft member and movable in substantially a straight path, and a longitudinally movable brake operating member carried by the draft member in spaced relation to the coupler head and in the path of the latter for actuation thereby.

4. A device of the class described comprising a structural draft member attachable to a trailer, two relatively movable elements carried by said draft member, one being a coupler head movable in substantially a straight path, the other being a longitudinally movable brake operating member in the path of and actuable by said coupler head, and means normally maintaining said elements apart but yieldable to permit operative engagement of one with the other.

5. A device of the class described comprising a structural draft member attachable to a trailer, two relatively movable elements carried by said draft member, one being a coupler head, the other being a brake operating member actuable by said coupler head, and means normally maintaining said elements apart but yieldable to permit operative engagement of one with the other.

6. A device of the class described comprising a structural draft member attachable to a trailer, two relatively movable elements carried by said draft member, one being a coupler head movable in substantially a straight path, the other being a longitudinally movable brake operating member in the path of and actuable by said coupler head, and means normally maintaining said elements apart but yieldable to permit operative engagement of one with the other, a part of said yieldable means being operable to resist movement of the coupler head in another direction when the trailer is pulled by a motor vehicle.

7. A device of the class described comprising a structural draft member attachable to a trailer, two relatively movable elements carried by said draft member, one being a coupler head, the other being a brake operating member actuable by said coupler head, and means normally maintaining said elements apart but yieldable to permit operative engagement of one with the other, a part of said yieldable means being operable to resist movement of the coupler head relative to the brake operating element when the trailer is pulled by a motor vehicle.

8. A device of the class described comprising a structural draft member attachable to a trailer, two relatively movable elements carried by the draft member, one being a coupler head, the other being a brake operating member actuable by said coupler head, a rod projecting from the coupler head and slidable in a part of the draft member, and means carried by the rod upon opposite sides of the part aforesaid of the draft member to normally maintain the coupler head in a predetermined inoperative position relative to the brake operating element.

9. A device of the class described comprising a structural draft member attachable to a trailer, two relatively movable elements carried by the draft member, one being a coupler head movable in substantially a straight path, the other being a brake operating member in the path of and actuable by said coupler head, a rod projecting from the coupler head in a direction substantially parallel to the path aforesaid and slidable in a part of the draft member, and means carried by the rod upon opposite sides of the part aforesaid of the draft member to normally maintain the coupler head in a predetermined inoperative position relative to the brake operating element.

CARL J. WAGNER.